US009049371B2

(12) United States Patent
Blanco et al.

(10) Patent No.: US 9,049,371 B2
(45) Date of Patent: Jun. 2, 2015

(54) METHOD AND APPARATUS FOR OPERATING A CAMERA

(71) Applicant: MOTOROLA SOLUTIONS, INC., Schaumburg, IL (US)

(72) Inventors: Alejandro G. Blanco, Ft. Lauderdale, FL (US); Shervin Sabripour, Plantation, FL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 294 days.

(21) Appl. No.: 13/743,703

(22) Filed: Jan. 17, 2013

(65) Prior Publication Data

US 2014/0199041 A1   Jul. 17, 2014

(51) Int. Cl.
| | |
|---|---|
| *H04N 5/232* | (2006.01) |
| *G08B 13/196* | (2006.01) |
| *G06K 9/00* | (2006.01) |
| *H04N 5/225* | (2006.01) |
| *H04N 7/18* | (2006.01) |

(52) U.S. Cl.
CPC ...... *H04N 5/23241* (2013.01); *G08B 13/19621* (2013.01); *G08B 13/19641* (2013.01); *G06K 9/00624* (2013.01); *H04N 5/225* (2013.01); *H04N 5/2259* (2013.01); *H04N 5/232* (2013.01); *H04N 7/181* (2013.01)

(58) Field of Classification Search
None
See application file for complete search history.

(56) References Cited

U.S. PATENT DOCUMENTS

| | | | |
|---|---|---|---|
| 6,215,519 B1 | 4/2001 | Nayar et al. | |
| 6,292,215 B1 | 9/2001 | Vincent | |
| 6,825,875 B1 | 11/2004 | Strub et al. | |
| 7,336,297 B2 | 2/2008 | Ishigami et al. | |
| 7,456,847 B2 | 11/2008 | Krajc | |
| 8,237,856 B2 | 8/2012 | Boland et al. | |
| 2002/0052708 A1* | 5/2002 | Pollard et al. | 702/151 |
| 2002/0102101 A1 | 8/2002 | Pelletier | |
| 2003/0151663 A1 | 8/2003 | Lorenzetti et al. | |
| 2004/0061774 A1* | 4/2004 | Wachtel et al. | 348/36 |
| 2007/0111754 A1 | 5/2007 | Marshall et al. | |
| 2009/0150965 A1* | 6/2009 | Christianen et al. | 725/135 |
| 2010/0026802 A1 | 2/2010 | Titus et al. | |
| 2010/0066830 A1 | 3/2010 | Dekeyser | |
| 2011/0128350 A1 | 6/2011 | Oliver et al. | |
| 2011/0128393 A1 | 6/2011 | Tavi et al. | |
| 2011/0295446 A1 | 12/2011 | Basir et al. | |
| 2012/0224065 A1 | 9/2012 | Schofield et al. | |
| 2012/0274776 A1 | 11/2012 | Gupta et al. | |

FOREIGN PATENT DOCUMENTS

| | | |
|---|---|---|
| GB | 2379354 A | 3/2003 |
| JP | 2000253387 A | 9/2000 |

OTHER PUBLICATIONS

PCT International Search Report Dated Mar. 27, 2014 for Counterpart Application PCT/US2014/011584.

\* cited by examiner

*Primary Examiner* — Hung Dang
*Assistant Examiner* — Sunghyoun Park
(74) *Attorney, Agent, or Firm* — Kenneth A. Haas

(57) ABSTRACT

A method and apparatus for operating a camera are provided herein. During operation of the camera, a first field of view (FOV) for the camera will be determined along with "undesirable" camera directions. A determination is made whether or not to obtain images from the camera based on whether or not the first FOV is aligned with an undesirable camera direction.

10 Claims, 4 Drawing Sheets

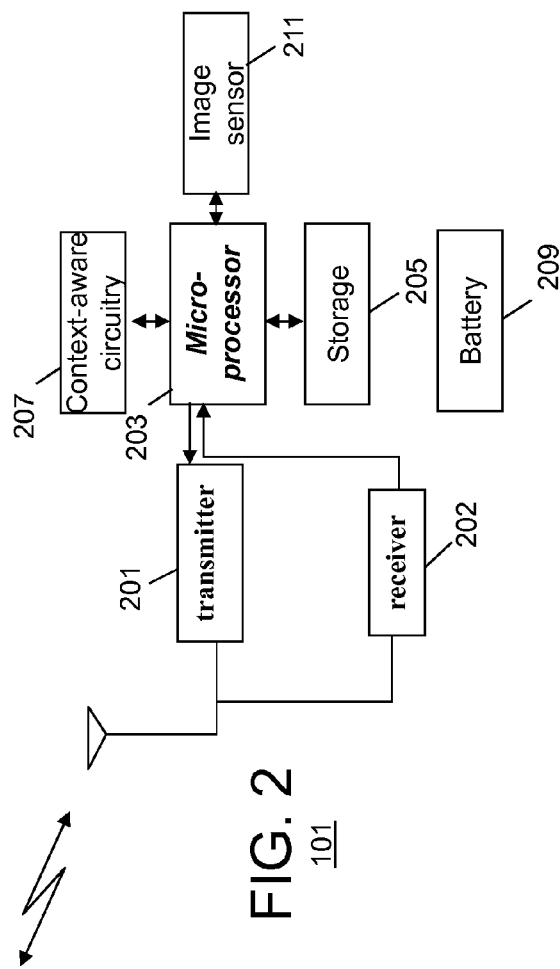
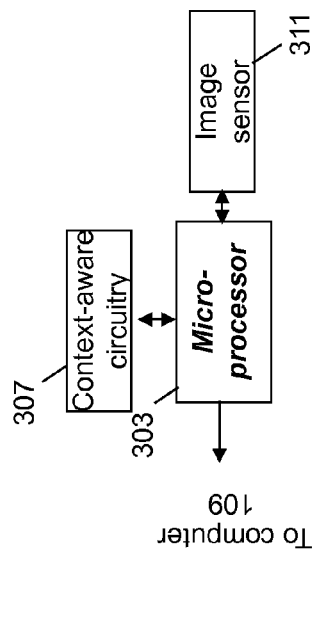

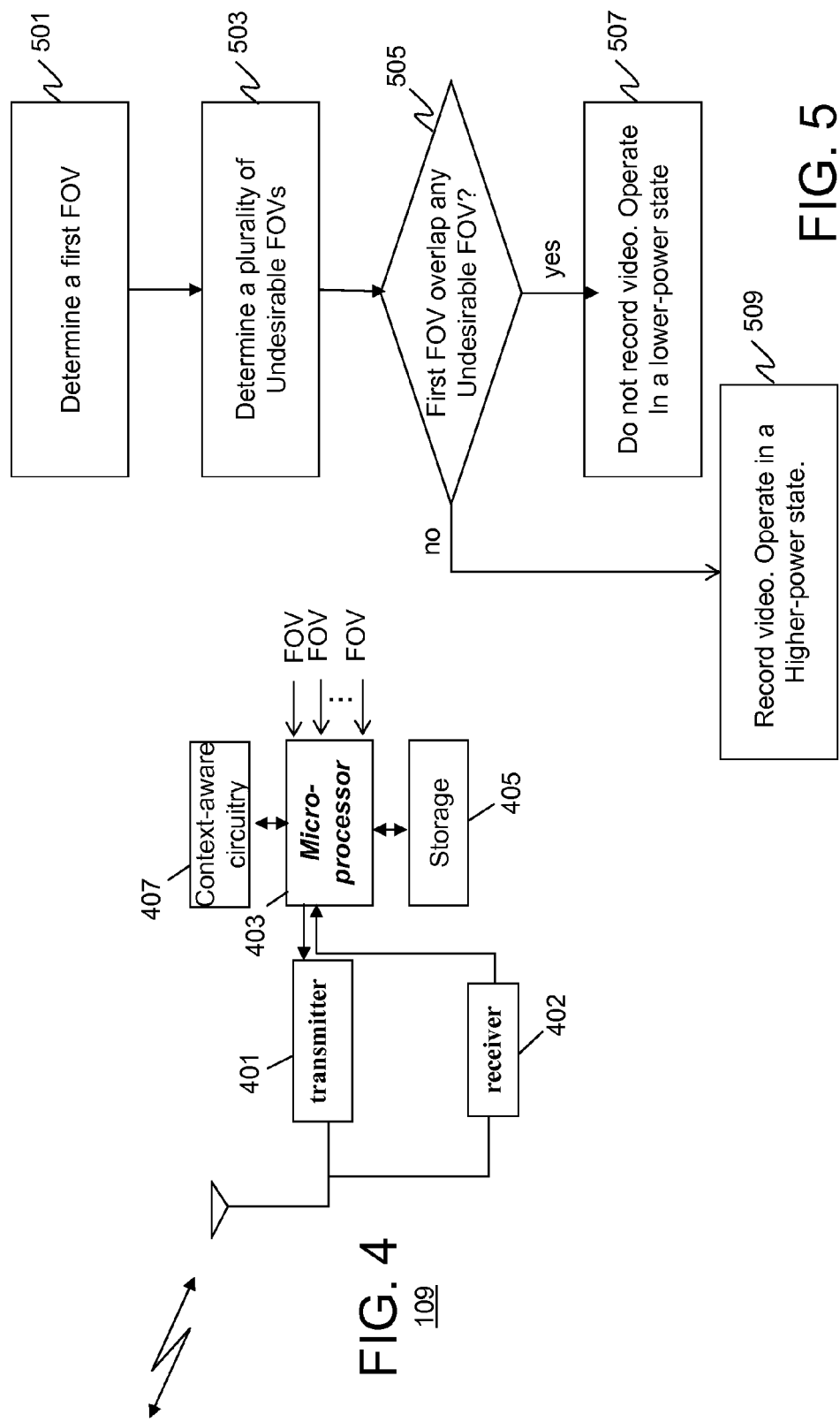

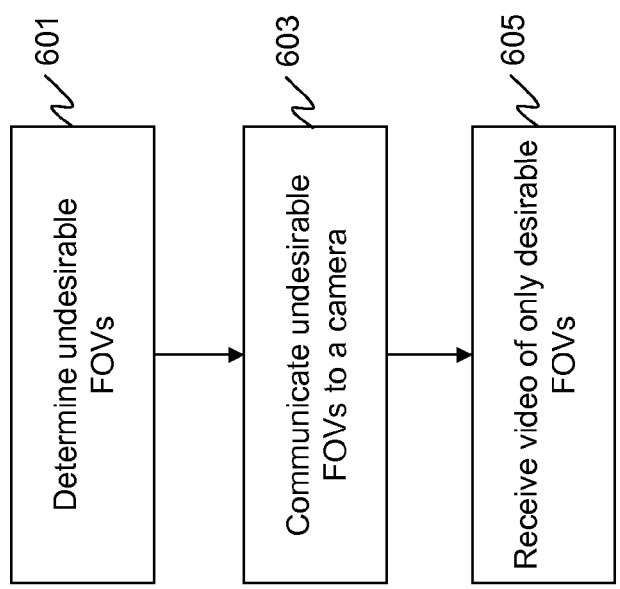

METHOD AND APPARATUS FOR OPERATING A CAMERA

FIELD OF THE INVENTION

The present invention generally relates to a method and apparatus for operating a camera, and more particularly to a method and apparatus for operating a camera based on the camera's field of view.

BACKGROUND OF THE INVENTION

In a public-safety environment, where a police officer may have a battery-operated, body-mounted camera, it is desirable to increase the battery life such that a greater amount of video may be obtained on a single battery charge. Therefore a need exists for a method and apparatus for operating a battery-operated camera that increases battery life.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

FIG. 2 is a block diagram of the battery-operated camera of FIG. 1.

FIG. 3 is a block diagram of a vehicle-mounted camera of FIG. 1.

FIG. 4 is a block diagram of the computer of FIG. 1.

FIG. 5 is a flow chart showing operation of the camera of FIG. 2.

FIG. 6 is a flow chart showing the operation of the computer of FIG. 4.

Figure 1:
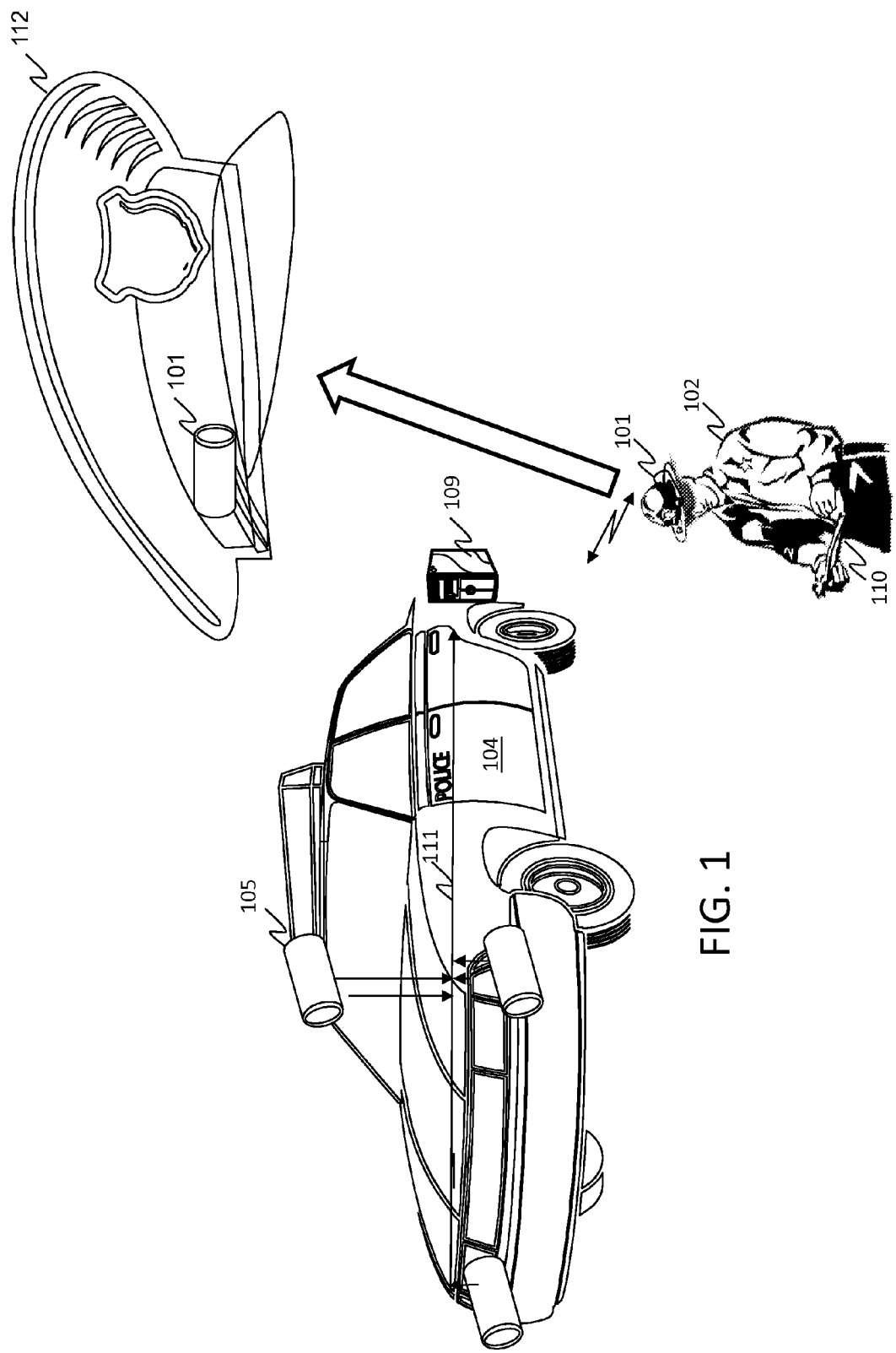
FIG. 1 is block diagram illustrating a general operational environment, according to one embodiment of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for operating a camera are provided herein. During operation of the camera, a first field of view (FOV) for the camera will be determined along with "undesirable" camera directions. A determination is made whether or not to obtain images from the camera based on whether or not the first FOV is aligned with an undesirable camera direction.

Expanding on the above, undesirable camera directions may be obtained based on field of views of a plurality of other cameras such that when the FOV of the camera overlaps a FOV from other cameras, the camera may be operated in a lower-power state. Thus, in this particular embodiment, a determination is made if the first FOV overlaps the FOV from any of the plurality of cameras. A determination is then made whether or not to obtain images from the camera based on whether or not the first FOV overlaps the FOV from any of the plurality of cameras.

In another embodiment undesirable camera directions may be obtained based on directions, and/or items that do not need to be imaged. For example, an undesirable camera direction may comprise a direction of a door when inside of an automobile (i.e., images of a door are not deemed desirable).

With the above in mind, this technique allows a battery-operated camera to be switched into a lower-power mode during those periods of time when the battery-operated camera will have an undesirable FOV. Switching into a lower-power mode as described will greatly increase the battery life for any battery-operated camera.

Turning now to the drawings wherein like numerals represent like elements, FIG. 1 illustrates a general operational environment, according to one embodiment of the present invention. As shown, police officer 102 is wearing a wearable battery-operated camera 101 on a hat. Camera 101 provides images to police car 104 for internal storage of any image or video. The storage is usually accomplished by providing the video feed to computer 109. This is preferably accomplished via a wireless interface to computer 109.

In addition to camera 101, cameras 105 are provided (only one labeled) which are mounted on police car 104. Cameras 105 also provide video for internal storage on computer 109. Communication between elements of system 100 is accomplished via bus(es) 111 and/or wirelessly. Although not shown, there may comprise additional wiring such as between computer 109 and camera mounts in order to remotely control camera mount positioning.

It should be noted that although camera 101 is shown mounted to hat 112, in other embodiments of the present invention camera 101 may be mounted to the shoulder or chest of a wearer or be contained in a wireless device used by the police officer 102. Also, while vehicle 104 is shown as an automobile, in alternate embodiments of the present invention vehicle 104 may comprise any mobile or stationary device, and may not necessarily comprise a vehicle. For example, cameras 105 may be mounted to stationary objects such as walls, rooftops, poles, . . . , etc.

FIG. 2 is a block diagram of the battery-operated camera of FIG. 1. Camera 101 comprises processor 203 that is communicatively coupled with various system components, including transmitter 201, receiver 202, general storage component 205, context-aware circuitry 207, battery 209, and an image or video sensor 211. Only a limited number of system elements are shown for ease of illustration; but additional such elements may be included in the camera 101.

Battery 209 provides power to device 101 when not hard connected to an external power source. Processing device 203 may be partially implemented in hardware and, thereby, programmed with software or firmware logic or code for performing functionality described in FIG. 5; and/or the processing device 203 may be completely implemented in hardware, for example, as a state machine or ASIC (application specific integrated circuit). All storage and components can include short-term and/or long-term storage of various information needed for the functioning of the respective elements. Storage 205 may further store software or firmware for programming the processing device 203 with the logic or code needed to perform its functionality.

Sensor 211 electronically captures a sequence of video frames (i.e., a sequence of one or more still images), with optional accompanying audio, in a digital format. Although not shown, the images or video captured by the image/video sensor 211 may be stored in the storage component 205, or may be sent directly to computer 109 via transmitter 201.

In a first embodiment, context-aware circuitry 207 preferably comprises a compass, however in alternate embodiments circuitry 207 may comprise any device capable of generating information used to determine a current FOV. For example, context-aware circuitry 207 may comprise a GPS receiver, level sensor, and compass. Regardless of the makeup of context-aware circuitry 207, logic circuitry 203 will use information generated by circuitry 207 to determine the camera's FOV.

Transmitter 201 and receiver 202 are common circuitry known in the art for communication utilizing a well known communication protocol, and serve as means for transmitting and receiving video and messages. For example, receiver 302 and transmitter 301 are well known transmitters that utilize the IEEE 802.11 communication system protocol. Other possible transmitters and receivers include, but are not limited to transceivers utilizing Bluetooth, HyperLAN protocols, or any other communication system protocol.

In a preferred embodiment processor 203 receives a plurality of undesirable FOVs. In a first embodiment these comprise field of views of other cameras 105. In a simple form, the FOVs simply comprise compass directions (e.g., a compass direction for each of three cameras, say, a first camera pointing at 105 degrees, a second camera pointing at 195 degrees, and a third camera pointing at 285 degrees). In a more advanced embodiment, the undesirable FOVs will comprise location information along with level information and compass direction such that particular undesirable FOVs (not necessarily aligned with any other camera) may be determined. For example, if the inside of a vehicle's door is considered an undesirable FOV, then a location (i.e., within the vehicle), a compass direction, and a level measurement (e.g., 10 degrees from level) may be used to determine an undesirable FOV.

Regardless of how the undesirable FOVs are determined, These undesirable FOVs are provided by computer 109 to receiver 202 and stored in storage 205. Processor 203 will then utilize context aware circuitry 207 to determine its current FOV (e.g., 14 degrees from North). When the current FOV is within a predetermined distance from a stored undesirable FOV, sensor 211 will be switched off and camera 101 will be operated in a lower-power state.

Thus, as described above, FIG. 2 shows an apparatus comprising logic circuitry 203 determining a first field of view (FOV) for a first camera, determining an undesirable FOV, and determining if the first FOV and the undesirable FOV overlap. Sensor 211 is provided for capturing video when the first FOV and the undesirable FOV do not overlap. The apparatus in FIG. 2 additionally comprises a wireless transmitter wirelessly transmitting the recorded video to a storage device. Camera 101 operates in a higher-powered state when the first FOV and the undesirable FOV do not overlap and operates in a lower-powered state when the first FOV and the undesirable FOV overlap. The higher-powered state consumes more battery power than the lower-powered state.

The undesirable FOV may comprise an FOV of a second camera or an FOV of an object. Wireless receiver 202 wirelessly receives any undesirable FOV. These undesirable FOVs may simply comprise a compass heading, or may additionally comprise a geographic location and a level reading.

FIG. 3 is a block diagram of a camera 105. As shown, cameras 105 comprise context-aware circuitry 307, microprocessor 303, and image sensor 311. All components in FIG. 3 are similar to the corresponding components described above with reference to FIG. 2. During operation, context-aware circuitry 307 provides microprocessor 303 information needed to determine a FOV. Microprocessor then determines a FOV and provides the FOV to computer 109. In a similar manner, microprocessor 303 provides any image/video obtained by sensor 311 to computer 109 for storage.

FIG. 4 is a block diagram of computer 109. As shown, computer 109 comprises processor 403 that is communicatively coupled with various system components, including transmitter 401, receiver 402, and general storage component 405. Context-aware circuitry 407 is provided as discussed above. All components in FIG. 4 are similar to the corresponding components described above with reference to FIG. 2.

When undesirable FOVs are determined based on other camera FOVs, then during operation, microprocessor 403 receives a plurality of FOVs from a plurality of cameras 105 mounted on vehicle 104. These FOVs are then transmitted wirelessly (via transmitter 401) to camera 101. In response, receiver 402 receives video/images from camera 101 when its FOV is not aligned with any FOV of cameras 105.

When undesirable FOVs are determined based on physical locations of areas where video is undesirable, then microprocessor 403 will determine it's location and a compass heading. Based on this information, undesirable FOVs can be determined for camera 101. For example, a current location of a driver's seat may be determined (e.g., 42 deg 04' 03.482343" lat., 88 deg 03' 10.443453" long. 727 feet above sea level), and a compass direction from the driver's seat to for example, a car door may be determined (e,g, 270 deg. from North), and a level direction from the driver's seat to the door is determined when the officer is seated (e.g., −25 deg. from level). This information can be passed to camera 101 so that when the camera's location, direction, and level are within a predetermined distance of the undesirable FOV (e.g., the car door), images/video will not be obtained.

FIG. 5 is a flow chart showing operation of the camera of FIG. 2 when operating in the environment shown in FIG. 1. The logic flow begins at step 501 where logic circuitry receives information from context-aware circuitry 207 to determine a first field of view (FOV) for sensor 211 (first FOV of a first camera). In a first embodiment of the present invention this is accomplished by logic circuitry 203 receiving a compass heading from circuitry 207 to determine a direction that image sensor 211 is facing. In a second embodiment of the present invention additional information is obtained (e.g., level, and location) to determine its FOV.

At step 503 microprocessor determines an undesirable FOV, or a plurality of undesirable FOVs (e.g., an FOV of a second camera, FOVs for a plurality of cameras 105, an FOV of an undesirable object, or FOVs of objects deemed unnecessary to record on video). This is preferably accomplished by accessing storage 205 to determine current compass headings for the plurality of cameras 105 or alternatively accomplished by determining location information for undesirable FOVs. The information on the undesirable FOVs preferably was provided earlier by computer 109 via a wireless transmission from computer 109 to camera 101, received by receiver 202, and stored in storage 205.

At step 505 microprocessor 203 determines if the first FOV overlaps any undesirable FOV (e.g., FOVs from any of the plurality of cameras or FOVs that are deemed unnecessary to obtain in video), and determines whether or not to operate the first camera based on whether or not the first FOV overlaps any undesirable FOV. More particularly, if, at step 505 microprocessor 203 determines that the first FOV overlaps any undesirable FOV, then the logic flow continues to step 507 where microprocessor 203 instructs image sensor 211 to power down and not record video, operating in a lower-powered state than when recording video. If, however, at step 505 it is determined that the first FOV does not overlap any undesirable FOV, then the logic flow continues to step 509 where microprocessor 203 instructs image sensor 211 to acquire video/images of the first FOV, operating in a higher-powered state than when not recording video.

As is evident, the process described above in FIG. 5 results in video of only desirable FOVs being recorded. The recorded video is preferably wirelessly transmitted via transmitter 201 to a storage device (e.g., computer 109). The desirable and undesirable FOVs may be characterized by a compass heading, a geographic location, and/or a level reading. The logic circuitry of camera 101 operates the sensor to collect video when the first FOV does not overlap an undesirable field of view such that the camera operates in a higher-powered state when collecting video. The logic circuitry operates the sensor to not collect video when the first FOV overlaps the undesirable FOV such that the camera operates in a lower-powered state when not collecting video.

The above technique also extends the life of battery 209 by operating the camera in a higher-powered state when the first FOV and the undesirable FOV do not overlap, and operating the camera in a lower-powered state when the first FOV and the undesirable FOV overlap, where the higher-powered state consumes more battery power than the lower-powered state.

FIG. 6 is a flow chart showing operation of computer 109. During operation, microprocessor 403 determines undesirable FOVs (step 601). As discussed above, these undesirable FOVs may be received from other cameras, or may alternatively be calculated by microprocessor 403. Regardless of how the undesirable FOVs are determined, these are then communicated wirelessly to camera 101 (step 603). This process may repeat regularly as undesirable FOVs may change as vehicle 104 moves, or, as camera 101 moves. Finally, at step 605 video is obtained from camera 101 of only desirable FOVs.

In the foregoing specification, specific embodiments have been described. However, one of ordinary skill in the art appreciates that various modifications and changes can be made without departing from the scope of the invention as set forth in the claims below. For example, while the preferred embodiment was described above using a simple compass to determine a FOV, one of ordinary skill in the art will recognize that other techniques may be utilized to determine a FOV. For example, in an alternate embodiment a GPS receiver may be utilized to determine a separation between camera 101 and cameras 105, so for example, when a separation becomes large, it will be assumed that the FOV differs even if a similar compass heading is determined between camera 101 and another camera 105. Thus for example, during a foot chase a police officer may roam blocks from cameras 105. When this happens, sensor 211 will not be switched off even if a similar compass heading is detected among cameras.

Additionally, one of ordinary skill in the art will appreciate that the technique described above can include a storage management approach where video is stored by either camera 101 or computer 109 in a circular buffer, as a first stage of storage. The video may be made more permanently by recording to a file upon a record decision. This approach does not materially affect the management of camera recording based on unfavorable FOVs.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   logic circuitry determining a first field of view (FOV) for a first camera, determining an undesirable FOV, and determining if the first FOV and the undesirable FOV overlap; and
   a sensor capturing video when the first FOV and the undesirable FOV do not overlap;
   wherein the first camera operates in a higher-powered state when the first FOV and the undesirable FOV do not overlap, operates in a lower-powered state when the first FOV and the undesirable FOV overlap, wherein the higher-powered state consumes more battery power than the lower-powered state.

2. The apparatus of claim 1 further comprising:
   a wireless transmitter wirelessly transmitting the recorded video to a storage device.

3. The apparatus of claim 1 wherein the undesirable FOV comprises a FOV of a second camera.

4. The apparatus of claim 1 wherein the undesirable FOV comprises a FOV of an object.

5. The apparatus of claim 1 further comprising a wireless receiver wirelessly receiving the undesirable FOV.

6. The apparatus of claim 1 wherein the first FOV and the undesirable FOV comprise a compass heading.

7. The apparatus of claim 6 wherein the first FOV and the undesirable FOV further comprise a geographic location.

8. The apparatus of claim 7 wherein the first FOV and the undesirable FOV further comprise a level reading.

9. A camera comprising:
   a wireless receiver receiving an undesirable field of view (FOV);
   a sensor used to collect video;
   context-aware circuitry;
   logic circuitry determining a first FOV from the context aware circuitry;
   a transmitter wirelessly transmitting any collected video; and
   wherein the logic circuitry operates the sensor to collect video when the first FOV does not overlap the undesirable field of view such that the camera operates in a higher-powered state when collecting video, and wherein the logic circuitry operates the sensor to not collect video when the first FOV overlaps the undesirable FOV such that the camera operates in a lower-powered state when not collecting video.

10. The camera of claim 9 wherein the undesirable FOV comprises a compass heading.

* * * * *